(No Model.) 2 Sheets—Sheet 1.
J. H. ROHME.
BELT SHIFTING AND BRAKE MECHANISM FOR SEWING MACHINES.
No. 428,859. Patented May 27, 1890.
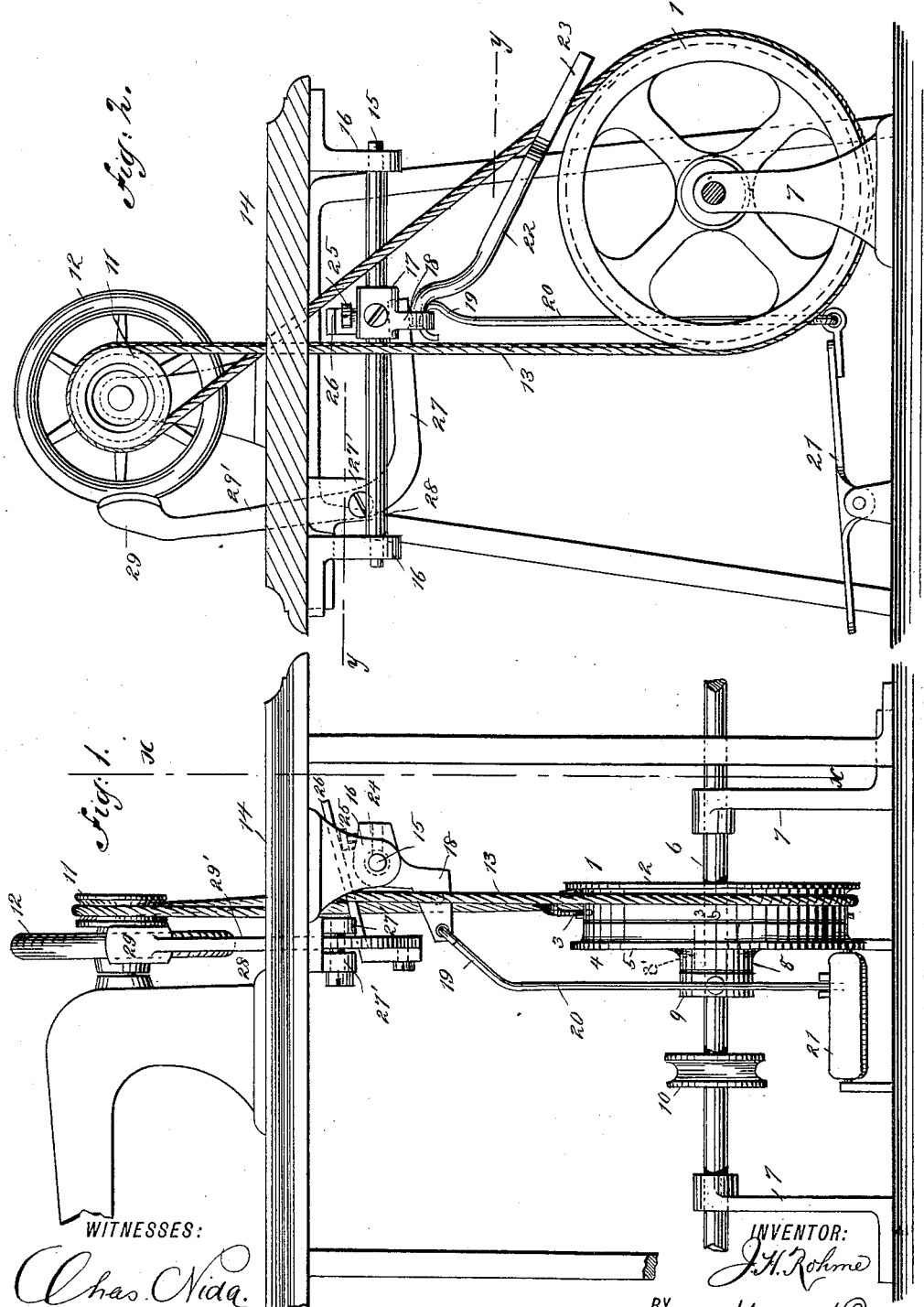
WITNESSES:
Chas. Nida.
C. Sedgwick
INVENTOR:
J. H. Rohme
BY Munn & Co.
ATTORNEYS.

(No Model.) 2 Sheets—Sheet 2.
J. H. ROHME.
BELT SHIFTING AND BRAKE MECHANISM FOR SEWING MACHINES.
No. 428,859. Patented May 27, 1890.
Fig. 3.
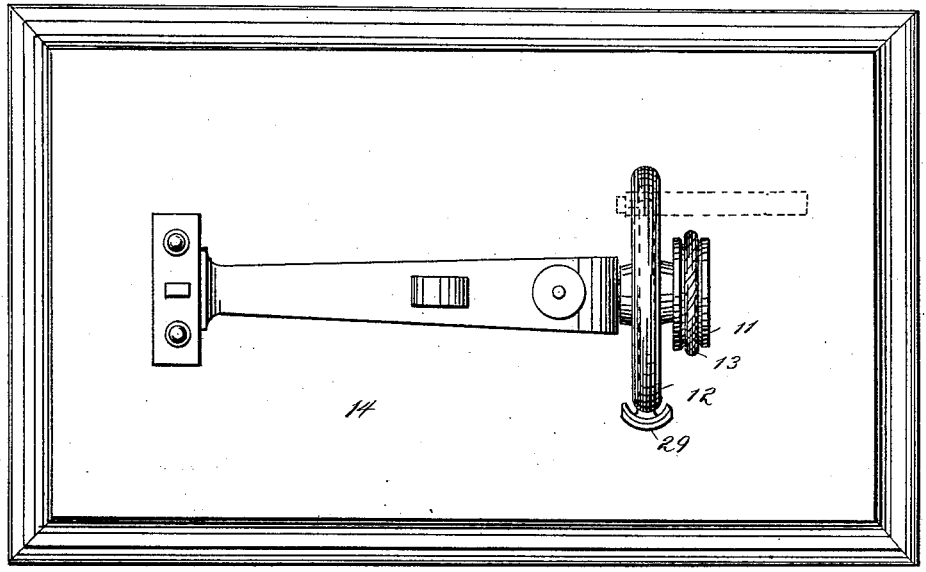
Fig. 4.
Fig. 5.
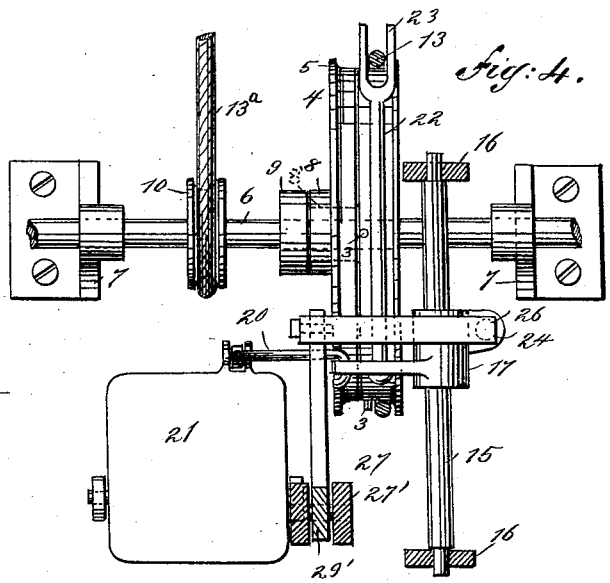
WITNESSES:
Chas. Niola.
C. Sedgwick.
INVENTOR:
J. H. Rohme
BY Munn & Co.
ATTORNEYS.

UNITED STATES PATENT OFFICE.

JAMES H. ROHME, OF NEWBURG, NEW YORK.

BELT-SHIFTING AND BRAKE MECHANISM FOR SEWING-MACHINES.

SPECIFICATION forming part of Letters Patent No. 428,859, dated May 27, 1890.

Application filed March 27, 1889. Serial No. 304,929. (No model.)

*To all whom it may concern:*

Be it known that I, JAMES H. ROHME, of Newburg, in the county of Orange and State of New York, have invented a new and useful Improvement in Belt-Shifting and Brake Mechanism for Sewing-Machines, of which the following is a full, clear, and exact description.

The invention relates to mechanism for connecting any one of a series or gang of sewing-machines to or disconnecting it from a continuous power-shaft in common to them all.

The invention has for its object to provide a mechanism connected with the driving-wheel and fly-wheel of a sewing-machine by means of which the driving-belt may be readily shifted to or unshipped from the driving-wheel while the latter is in motion and a regulated pressure applied to the fly-wheel to brake it.

The invention consists in a combined belt-shifting mechanism and brake for sewing-machines, constructed and arranged as hereinafter described and claimed.

Reference is to be had to the accompanying drawings, forming a part of this specification, in which similar figures of reference indicate corresponding parts in all the views.

Figure 1 is a view in elevation of a portion of a sewing-machine with the invention applied. Fig. 2 is a side view thereof, in vertical section, on line $x\,x$ of Fig. 1. Fig. 3 is a plan view of the machine. Fig. 4 is a horizontal section on the line $y\,y$ of Fig. 2; and Fig. 5 shows details of the invention, partly in section and broken away.

1 indicates the driving-wheel of a gang sewing-machine, formed with a flange 2 on one edge of its periphery and a number of spaced pins 3 on its other edge, the pins 3 serving as a flange for the wheel 1. Adjacent to the wheel 1 is a loose wheel 4, formed with a flange 5 on one edge and having its other side arranged close to the driving-wheel 1. The driving-wheel 1 is fixed rigidly on a shaft 6, mounted in and extending through vertical bearings or brackets 7, the shaft 6 being the driving-shaft of a gang of sewing-machines and extending beneath the sewing-machines and mounted in suitable bearings. The loose wheel 4 has a hub 8, mounted to turn on a hub 8' (shown in dotted lines) of the wheel 1, and is held adjacent to the wheel 1 by a collar 9, secured to the shaft 6 and abutting against the hub 8 on the wheel 4.

10 indicates a grooved pulley mounted on shaft 6 and adapted to be connected by a driving-belt $13^a$, Fig. 4, with a suitable prime mover.

The driving-wheel 1 is connected by a crossed belt 13 with a pulley 11 on the same shaft as the fly-wheel 12, through which connection power is transmitted to the sewing-machine.

When the machine is running, the cord 13 is effectively held on the wheel 1 by the pins 3.

In order to shift the cord 13 from the wheel 1 to the loose wheel 4, or vice versa, the following-described mechanism is employed: Upon a shaft 15, mounted in hangers 16, depending from the table 14, is hung a sleeve 17, having a projecting L-shaped arm 18, to which is connected the hooked inclined upper end 19 of a vertical rod 20, pivotally connected at its lower end to a treadle 21. From the arm 18 projects at right angles an arm 22, extending over the periphery of wheel 1, and having a forked end 23, embracing the cord 13.

The sleeve 17 has a short arm 24 extending in the opposite direction from the arm 18, and having an adjustable screw-stud 25, (see Fig. 5,) above which rests the end of the arm 26, secured at its other end to the lower horizontal end 27 of an L-shaped brake-lever 28, pivoted in brackets 27', depending from table-top 14, and having its brake-shoe 29 located on the upright arm 29' of lever 28, adjacent to the periphery of fly-wheel 12, the arm 29' projecting up through a slot in table-top 14.

In the position of the parts shown the sewing-machine is being driven by the power-shaft.

If it be desired to stop the machine, it is simply necessary to raise the rod 20 by the treadle 21, which movement raises the arm 18, moves the forked arm 22 laterally to the left of Fig. 1, and thereby causes the cord 13 to be moved over the pins 3 onto the loose pulley 4.

In the above operation the rod 20, in raising the arm 18, lowers the arm 24, and with it the arms 26 and 27, which advances the shoe 29' against the periphery of wheel 12, thus applying the brake to the sewing-machine simultaneously with its disconnection from the power-shaft. While the cord 13 is located on the loose wheel 4 the wheel 1 continues to rotate with the shaft 6, operated by the endless belt connected with pulley 10, as hereinbefore mentioned.

When it is desired to start the sewing-machine again, the rod 20 is lowered by means of the treadle 21, which acts through the intermediate connections to swing the forked arm 22 over to the plane of the continuously-revolving wheel 1, causing the cord 13 to be carried over the pins 3 successively and shifted onto the wheel 1. At the same time that the cord 13 is shipped onto the wheel 1 the brake-shoe is released from wheel 12 by the raising of short arm 24 and screw 25, which latter lifts the arm 26 and horizontal arm 27 of the brake-lever, throwing the upright arm with its brake-shoe away from the fly-wheel. By adjusting the screw-stud on arm 24 the brake-lever 28 may be made to respond more or less quickly to the action of arm 24.

It will thus be seen that by means of this invention a gang sewing-machine may be readily stopped and put in motion by the operator without disconnecting the main driving-shaft connected with the power.

If preferred, but one pin 3 may be employed instead of a number, and I therefore do not limit myself to a number of pins.

Having thus described my invention, what I claim as new, and desire to secure by Letters Patent, is—

1. A combined belt-shifting and brake mechanism for sewing-machines, consisting of a grooved pulley mounted on the shaft of a sewing-machine fly-wheel, a driving-shaft having mounted thereon a loose wheel and a fixed driving-wheel abutting together and having flanges on their outer edges and being without flanges on their inner edges, the adjacent edge of the fixed wheel having one or more pins, an endless cord connecting the grooved pulley on the fly-wheel shaft with the fixed wheel on the driving-shaft, a crank-lever mechanism with connecting-rod and an operating-treadle, and a belt-shifting arm connecting with the endless cord, and a second crank-lever mechanism operated by the first crank-lever mechanism and having a brake-lever with a brake-shoe adjacent to the fly-wheel, substantially as shown and described.

2. In a combined belt-shifting and brake mechanism for sewing-machines, a grooved pulley mounted on the fly-wheel shaft of a sewing-machine, a driving-shaft having mounted thereon a loose wheel and a fixed driving-wheel abutting together and having flanges on their outer edges, the adjacent edge of the fixed wheel having one or more pins, an endless cord connecting the grooved pulley on the fly-wheel shaft with the fixed wheel on the driving-shaft, and a crank-lever mechanism with a connecting-rod, an operating-treadle, and a belt-shifting arm connecting with the endless cord, substantially as shown and described.

3. In a combined belt-shifting and brake mechanism for sewing-machines, a grooved pulley mounted on the fly-wheel shaft of a sewing-machine, a driving-shaft having mounted thereon a fixed driving-wheel and a loose wheel mounted on the projecting hollow hub of the fixed driving-wheel, the loose and fixed wheels having flanges on their outer edges, and the adjacent edge of the fixed wheel having one or more pins, an endless cord connecting the grooved pulley on the fly-wheel shaft with the fixed driving-wheel, and a crank-lever mechanism with a connecting-rod, an operating-treadle, and a belt-shifting arm connecting with the endless cord, substantially as shown and described.

The foregoing specification of my new and improved combined belt-shifting and brake mechanism for sewing-machines signed by me this 20th day of March, 1889.

JAMES H. ROHME.

Witnesses:
C. SEDGWICK,
E. M. CLARK.